United States Patent [19]

Tanaka et al.

[11] 4,088,608
[45] May 9, 1978

[54] CATALYSTS FOR REFORMING HYDROCARBON FUELS

[75] Inventors: Masao Tanaka, Aichi; Makoto Takemura; Nobuei Ito, both of Okazaki, all of Japan

[73] Assignee: Nippon Soken, Inc., Japan

[21] Appl. No.: 745,047

[22] Filed: Nov. 26, 1976

[30] Foreign Application Priority Data

Dec. 17, 1975    Japan .................................. 50-151099

[51] Int. Cl.² .......................... B01J 21/04; B01J 23/58
[52] U.S. Cl. ............................ 252/466 PT; 48/214 A
[58] Field of Search ................... 252/466 PT; 48/212, 48/214 A, 215

[56] References Cited

U.S. PATENT DOCUMENTS

| | | | |
|---|---|---|---|
| 3,271,325 | 9/1966 | Davies et al. | 252/463 X |
| 3,436,358 | 4/1969 | Thygesen | 48/212 X |
| 3,481,722 | 12/1969 | Pfefferle | 48/214 A |
| 3,641,182 | 2/1972 | Box et al. | 252/466 PT |

*Primary Examiner*—W. J. Shine
*Attorney, Agent, or Firm*—Cushman, Darby & Cushman

[57] ABSTRACT

A catalyst for reforming hydrocarbon fuels into a hydrogen-rich reformed gas comprising an active carrier consisting of magnesium aluminate of spinel structure as represented by the formula $$MgAl_2O_4$$

and at least one catalyst metal selected from the group consisting of platinum, rhodium and a mixture thereof supported by said carrier.

5 Claims, 19 Drawing Figures

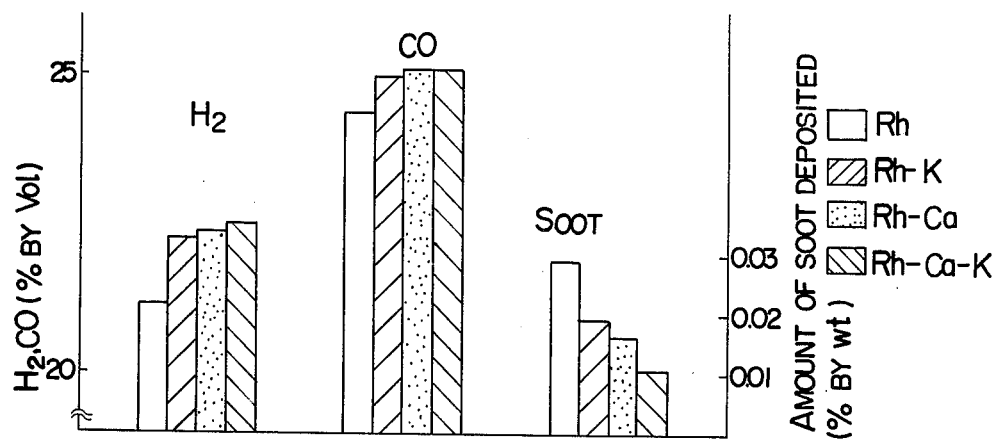
F I G. 13
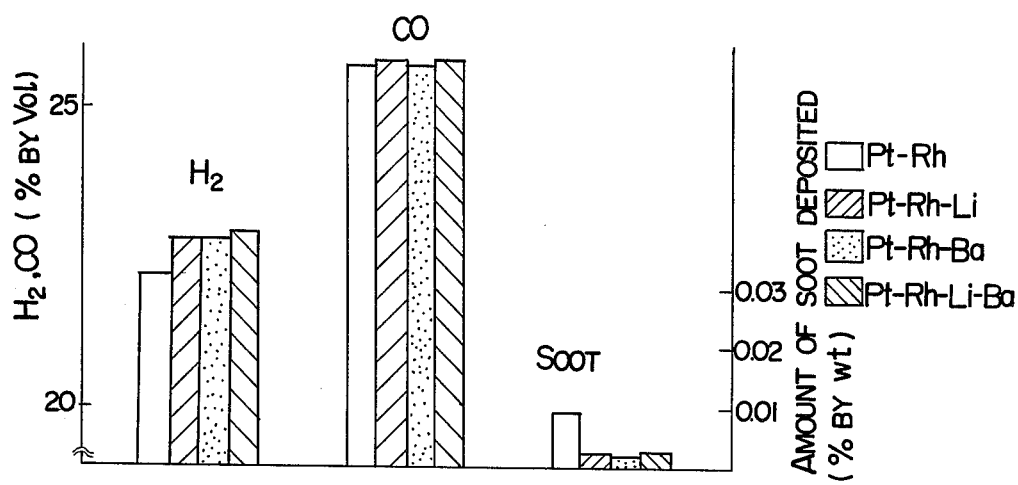
F I G. 14

F I G. 17
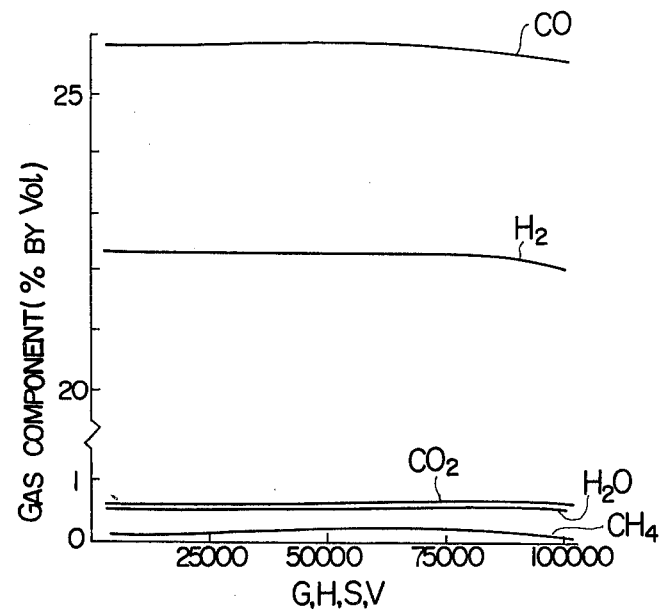
F I G. 18
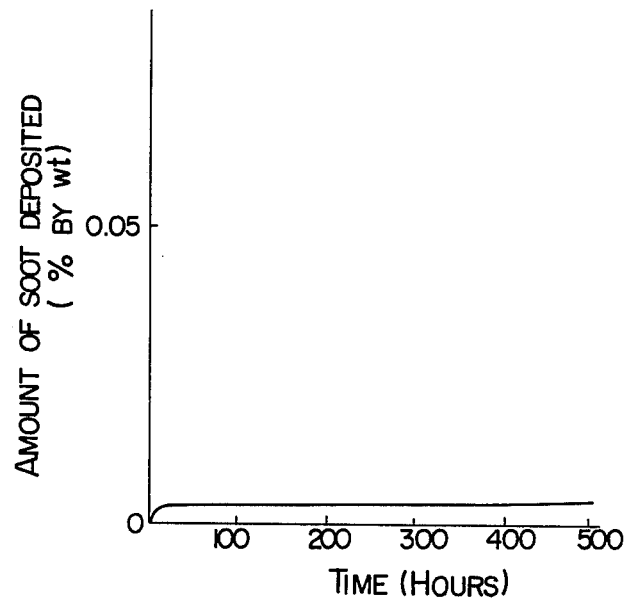

CATALYSTS FOR REFORMING HYDROCARBON FUELS

The present invention relates to catalysts for reforming hydrocarbon fuels. More particularly, the invention pertains to catalysts for reforming hydrocarbon fuels which show very little thermal degradation or formation of soot even if reforming reaction is carried out continuously to reform a hydrocarbon fuel into a hydrogen-rich gas.

As one of method for solving the problem of purifying exhaust gas of automobiles, combustion on a lean side, that is, combustion in a more lean state than stoichiometric air-fuel ration is considered. In the case of gasoline as a hydrocarbon fuel presently used, however, various problems such as low ignitability due to non-uniform fuel distribution in an engine and vibration produced from misfiring phenomenon occur even in a state stoichiometrically within an explosion limit. The above-mentioned problems can be solved by using as a fuel hydrogen having a wider explosion limit and a small ignition energy. Here, part or all of the hydrocarbon fuel may be reformed into a hydrogen-rich gas and may be used together with a lean gasoline-air mixture.

In order to reform hydrocarbon fuels into a hydrogen-rich gas, catalysts of nickel supported by a carrier comprising γ-alumina have heretofore been often used.

The nickel catalysts have a defect that their catalytic activity is deteriorated by heat on the reforming reaction or by oxygen supplied on the reforming reaction. γ-Alumina as a constituent of the carrier is often reacted thermally with nickel or nickel is slowly crystallized by heat. In order to prevent these undesirable reactions, additives and carriers have been studied but satisfactorily durability has not yet been obtained. On the one hand, catalysts are often active only in a state. Nickel is also highly active in a state as a metal. In the presence of oxygen, however, metallic nickel is converted into nickel oxide by a slight increase in temperature and its activity is lost. Therefore, the metallic nickel must be handled with thorough care. Particularly, when reforming conditions fluctuate greatly, oxidation occurs. In such a case, the supply of the fuel, water and air must be strictly controlled. Also, even if such strict control is carried out, soot is gradually produced by a side reaction even in the reforming reaction wherein soot is stoichiometrically not produced. Therefore, the degradation of the catalyst is accelerated until the catalyst is disintegrated by soot and reforming becomes impossible.

It is, therefore, the principal object of the present invention is to avoid the difficulties heretofore encountered in the prior art nickel catalysts for reforming hydrocarbon fuels into a hydrogen-rich gas.

It is a further object to provide a catalyst for reforming hydrocarbon fuels into a hydrogen-rich gas which shows very little thermal degradation or formation of soot even if reforming reaction is carried out continuously.

Another object of the present invention is to provide a catalyst for reforming hydrocarbon fuels into a hydrogen-rich gas which can reform satisfactorily even hydrocarbon fuels having a smaller molecular weight than that of gasoline.

These and other objects and advantages of the invention will be apparent from the following description and claims, taken in conjunction with the accompanying drawings in which:

FIG. 1 is a schematic representation of a catalyst of the present invention.

FIG. 13 shows a comparison between a Rh on $MgAl_2O_4$ catalyst, a Rh — K on $MgAl_2O_4$ catalyst, a Rh — Ca on $MgAl_2O_4$ catalyst and a Rh — Ca — K on $MgAl_2O_4$ catalyst with regard to the amounts of $H_2$ and CO generate and the amount of soot formed.

FIG. 14 shows a comparison between a Pt — Rh on $MgAl_2O_4$ catalyst, a Pt — Li on $MgAl_2O_4$ catalyst, a Pt — Rh — Ba on $MgAl_2O_4$ catalyst and a Pt — Rh — Li — Ba on $MgAl_2O_4$ catalyst with regard to the amounts of $H_2$ and CO generated and the amount of soot formed.

FIG. 17 shows the relationship between the results of reforming and the space velocity (G.H.S.V.) of the reformed gas in the Pt — Rh — Li — Ba on MgAl$_2$O$_4$ catalyst of Example 13 after its use of 500 hours.

FIG. 18 shows the formation of soot with the lapse of time in reforming for 500 hours by the use of the Pt — Rh — Li — Ba on MgAl$_2$O$_4$ catalyst of Example 13.

According to the present invention, there is provided a catalyst for reforming hydrocarbon fuels into a hydrogen-rich reformed gas comprising an active carrier consisting of magnesum aluminate of spinel structure as represented by the formula MgAl$_2$O$_4$ and at least one catalyst metal selected from the group consisting of platinum, rhodium and a mixture thereof supported by said carrier.

The active carrier consisting of magnesium aluminate of spinel structure as represented by the formula MgAl$_2$O$_4$ which may be used in the present invention has high crushing strength and a large surface area and plays a part as a catalyst carrier thoroughly. The term "active" used in the carrier of the present invention means that the surface of the carrier shows a porous state. As the surface is porous, the surface area is large. The active carrier of the present invention has a slight catalytic activity and is effective in preventing the formation of soot on reforming reaction.

The magnesium aluminate for constituting the active carrier of the present invention can be obtained by, for example, reacting and calcining γ-alumina and magnesium oxide at a high temperature or by reacting and calcining γ-alumina and a magnesium salt. γ-Alumina is generally called "activated alumina". As the activated alumina, nordstrandite, gibbsite, bialite, boehmite, diaspore, η-alumina, χ-alumina, θ-alumina, δ-alumina, ρ-alumina, κ-alumina and β-alumina are known. Of course, they may be used aone or in admixture.

In the present invention, it is possible to use so-called inactive alumina such as α-alumina in place of activated alumina. α-Alumina can be obtained also by calcining but the surface of the resulting calcined product is not porous. In order to make the surface porous, for example, combustible substances lost by calcining may be added and mixed or a formed ceramic material may be added and mixed.

Platinum and rhodium used in the present invention are highly active without being oxidized in the presence of oxygen, and do not form a compound (spinel) with the alumina contained in the carrier. Also, platinum, rhodium and a mixture thereof with an alkali metal and/or an alkaline earth metal show almost no crystallization due to thermal effects and thermal resistance is improved.

Figure 1A:
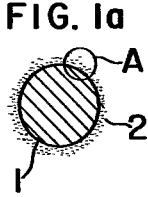
FIG. 1(a) is a section view of the catalyst and FIG. 1(b) is an enlarged view of part A in FIG. 1(a).
Figure 1B:

The structure of one example of the catalysts of the present invention is schematically shown in FIGS. 1(a) and 1(b). In FIGS. 1(a) and 1(b), carrier (1) consists of magnesium aluminate of spinel structure obtained by reacting γ-alumina with a magnesium salt with calcining and is in the form of pellet. Since the carrier (1) is made up of porous particles of magnesium aluminate (1a), the surface of the carrier (1) is porous as shown in FIG. 1(b). On the surface, a catalyst metal (2) of platinum and/or rhodium or a mixture thereof with an alkali metal and/or an alkaline earth metal or a mixture thereof is supported.

The catalysts of the present invention are used mainly in the reforming of gasoline, but may be used satisfactorily also in the reforming of hydrocarbon fuels having a smaller molecular weight than that of gasoline.

As described above, the catalysts of the present invention are excellent in that they hardly show crystallization of the catalyst metal due to thermal effects, formation of a compound of the catalyst metal with the carrier, reduction in catalytic activity in the presence of oxygen, formation of soot and disintegration of the catalysts by formation of soot when reforming reaction is carried out by charging a hydrocarbon fuel, air and/or water in such amounts in formation of soot does not occur stoichiometrically.

The following examples illustrate the present invention in more detail.

EXAMPLE 1

Figure 2:
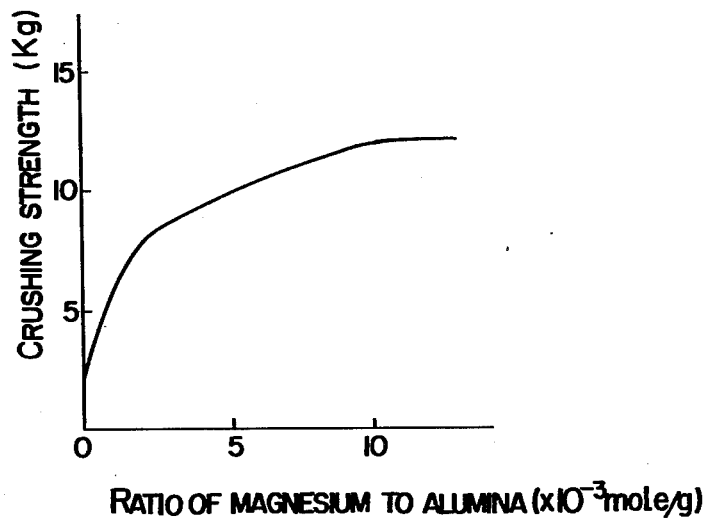
FIG. 2 shows the relationship between the ratio of magnesium to alumina in a carrier and the crushing strength of the catalyst.

Granular γ-alumina (bulk density 0.7; water absorption 60% by weight) is dipped in an aqueous solution containing 1.5 moles per liter of magnesium nitrate, dried (200° C), calcined at 600° C and then cooled. This operation is repeated four times. The resulting particles are further calcined at 1200° C for 2 hours to obtain a granular carrier of spinel structure consisting of magnesium aluminate represented by the formula MgAl$_2$O$_4$ The quantitative analysis of the carrier of spinel structure shows that the magnesium content is $3.86 \times 10^{-3}$ mole per gram of alumina. The carrier of spinel structure is placed in an atmosphere at 1000° C for 200 hours, and the crushing strength of the carrier is then measured. In this case, a ratio of magnesium to alumina in the constituents of the carrier is varied. The results obtained are shown in FIG. 2. The measurement of crushing strength is carried out by applying a pressure to one particle of the granular carrier of spinel structure having a diameter of 3 mm and reading the pressure at which the particle is broken. Also, the ratio of magnesium to alumina is varied by varying the concentration of magnesium nitrate.

As is clear from FIG. 2, the crushing strength is less than 8 kg at the ratio of magnesium to alumina of less than $2 \times 10^{-3}$ mole/g, 8 - 12 kg at $2 \times 10^{-3}$ to $1 \times 10^{-2}$ mole/g, and 12 kg (constant) at more than $1 \times 10^{-2}$ mole/g. According to the present inventors' experiments, it has been found that the granular carrier is fit enough for use at a place which receives vibration if its crushing strength is 8 - 12 kg. Therefore, a ratio of magnesium to alumina of $2 \times 10^{-3} - 1 \times 10^{-2}$ mole/g is preferable.

Only the granular carrier of spinel structure used in the measurement of crushing strength is used in the reforming of gasoline which is a hydrocarbon fuel. The reforming is carried out for 300 hours under the conditions (hereinafter referred to as "condition I"):

| | |
|---|---|
| Gasoline | 320 cc/hr |
| Air | 1,000 2/hr |
| (A ratio of air to fuel 5.1) | |
| Space velocity (G.H.S.V.) of reformed gas | 50,000 |
| Temperature of carrier | 800° C |

Figure 3:
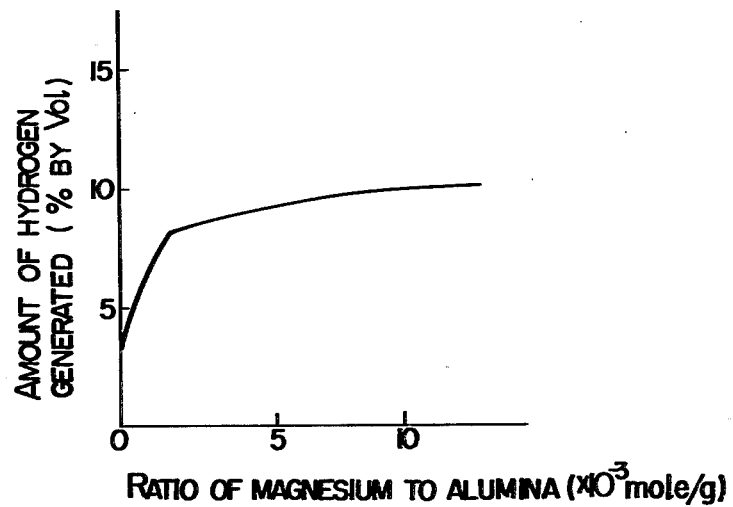
FIG. 3 shows the relationship between the ratio of magnesium to alumina in a carrier and the amount of hydrogen generated.

The amount of hydrogen generated is then measured. In this case, a ratio of magnesium to alumina in the constituents of the carrier is varied. The results obtained are shown in FIG. 3. As is clear from FIG. 3, the amount of hydrogen generated is less than 8% by volume at the ratio of magnesium to alumina of less than $1.5 \times 10^{-3}$ mole/g, 8 - 10% by volume at $1.5 \times 10^{-3} - 1 \times 10^{-2}$ mole/g, and 10% by volume (constant) at more than $1 \times 10^{-2}$ mole/g. Also, the fact that hydrogen can be obtained with only the carrier of spinel structure shows that the carrier of spinel structure has a catalytic activity. The granular carrier of spinel structure as prepared as a granular carrier according to the above-mentioned process is dipped in an aqueous solution containing 0.1 mole/l of chloroplatinic acid dissolved therein, dried (120° C) and then reduced with hydrogen at 200° C to obtain a granular catalyst. The catalyst thus produced contains $5.43 \times 10^{-5}$ mole of platinum per gram of alumina.

This catalyst is used in the reforming of gasoline under the above-mentioned conditon I. The results obtained are shown in Table 1.

Table 1

| Product gas (% by vol.) | $H_2$ | CO | $CH_4$ | $CO_2$ | $H_2O$ | $N_2$ | Soot (% by wt.) |
|---|---|---|---|---|---|---|---|
| Initial stage | 22.8 | 25.9 | — | 0.2 | 0.2 | 50.9 | — |
| After 300 hours | 22.5 | 25.1 | 0.1 | 0.5 | 0.3 | 51.5 | 0.02 |

Gasoline is reformed into gas components such as $H_2$, CO, etc., but the formation of a small amount of soot is found on the catalyst after 300 hours.

The reforming of gasoline is carried out by the use of the catalyst as produced above for 300 hours under the conditions (hereinafter referred to as "condition II"):

| | |
|---|---|
| Gasoline | 320 cc/hr |
| Water | 83.6 cc/hr |
| Air | 1,000 l/hr |
| G.H.S.V. | 50,000 |
| Temperature of catalyst | 800° C |

The results obtained are shown in Table 2.

Table 2

| Product gas (% by vol.) | $H_2$ | CO | $CH_4$ | $CO_2$ | $H_2O$ | $N_2$ | Soot (% by wt.) |
|---|---|---|---|---|---|---|---|
| Initial stage | 29.3 | 28.4 | — | 0.5 | 0.6 | 41.2 | — |
| After 300 hours | 28.2 | 27.5 | 0.1 | 1.0 | 0.9 | 42.3 | 0.01 |

Gasoline is reformed into gas components such as $H_2$, CO, etc. and the amount of soot deposited is small. Thus, it is found that soot is not so formed even by the addition of water.

Figure 4:
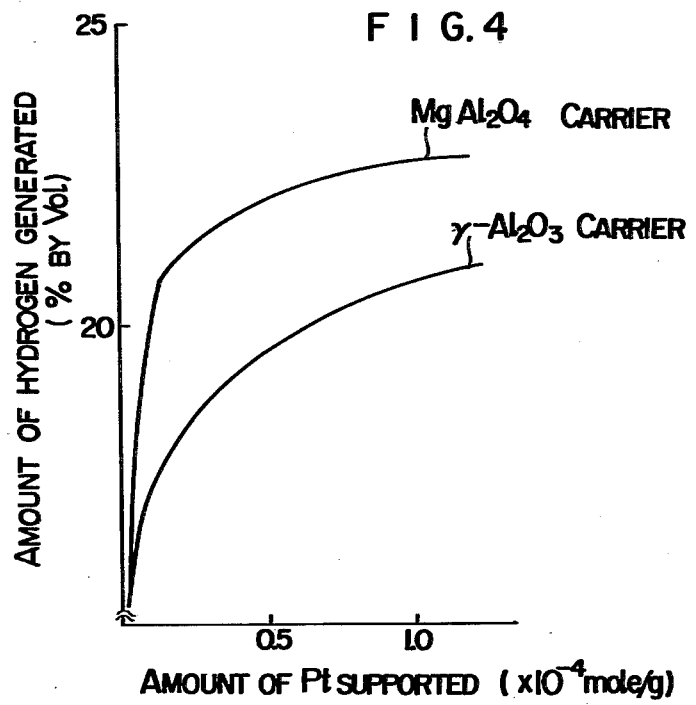
FIG. 4 shows the relationship between the amount of platinum supported and the amount of hydrogen generated in a carrier consisting of magnesium aluminate of spinel structure and a carrier consisting of γ- alumina, respectively.

Further, the granular carrier of spinel structure and granular γ-alumina carrier as produced according to similar methods to those described above are prepared. These carriers each are dipped in an aqueous chloroplatinic acid solution, dried at 120° C, and then reduced with hydrogen at 200° C to obtain a granular catalyst of a carrier of spinel structure and a granular catalyst of a γ-alumina carrier, respectively. The amount of platinum supported based on alumina in the respective carrier is varied by varying the amount of chloroplatinic acid in the aqueous solution, and the reforming of gasoline is carried out for 300 hours under the above-mentioned condition I. The reforming results after 300 hours are shown in FIG. 4. As is clear from FIG. 4, the carrier of spinel structure shows a larger amount of hydrogen generated even at a smaller amount of platinum supported. It shows that the carrier of spinel structure has a promoter effect.

EXAMPLE 2

The granular carrier of spinel structure as produced according to a similar method to that in Example 1 is dipped in an aqueous solution containing 0.1 mole/l of rhodium chloride dissolved therein, dried (120° C) and then reduced with hydrogen at 200° C to obtain a granular catalyst. The catalyst thus produced contains 5.76 $\times 10^{-5}$ mole per gram of the carrier of rhodium. This catalyst is used in the reforming of gasoline under the above-mentioned condition I. The results obtained are shown in Table 3.

Table 3

| Product gas (% by vol.) | $H_2$ | CO | $CH_4$ | $CO_2$ | $H_2O$ | $N_2$ | Soot (% by wt.) |
|---|---|---|---|---|---|---|---|
| Initial stage | 22.7 | 26.0 | — | 0.2 | 0.3 | 50.8 | — |
| After 300 hours | 21.2 | 24.4 | 0.2 | 2.1 | 1.2 | 50.9 | 0.03 |

Gasoline is reformed into $H_2$ CO, etc. The amounts of the gases formed after 300 hours is about the same as those at initial stage. Also, the amount of soot deposited is as small as 0.03% by weight.

Figure 5:
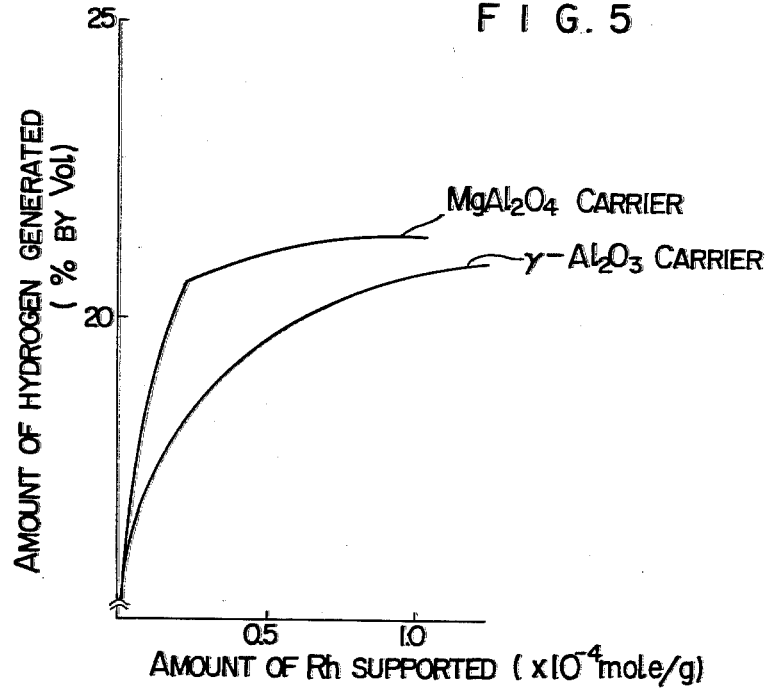
FIG. 5 shows the relationship between the amount of rhodium and the amount of hydrogen generated in a carrier consisting of magnesium aluminate of spinel structure and in a carrier consisting of γ-alumina, respectively.

The granular carrier of spinel structure and granular alumina carrier is produced according to similar methods as those in Example 1 are prepared. These carriers each are dipped in an aqueous rhodium chloride solution, dried at 120° C, and then reduced with hydrogen at 200° C to obtain a granular catalyst of a carrier of spinel structure and a granular catalyst of a γ-alumina carrier, respectively. The amount of rhodium supported based on alumina in the respective carrier is varied by varying the amount of rhodium chloride in the aqueous solution. The reforming of gasoline is carried out by the use of the thus obtained catalysts for 300 hours under the above-mentioned condition I. The results of the reforming after 300 hours are shown in FIG. 5. As is clear from FIG. 5, the carrier of spinel structure shows a larger amount of hydrogen generated even at a small amount of rhodium supported. It shows that the catalyst of spinel structure has a promoter effect.

EXAMPLE 3

A similar granular carrier of spinel structure to that in Example 1 is prepared. The granular carrier of spinel structure is dipped in a mixed aqueous solution containing 0.12 mole of chloroplatinic acid and 0.012 mole of rhodium chloride per liter, dried (120° C) and then reduced with hydrogen at 200° C to obtain a granular catalyst. In the thus produced catalyst, the amounts of platinum and rhodium are $5.10 \times 10^{-5}$ mole/g and $4.81 \times 10^{-6}$ mole/g, respectively, based on the alumina constituting the carrier.

In order to show the superiority of the magnesium aluminate carrier, the above-mentioned granular carrier is compared with the following catalysts (A) and (B).

(A) γ-Alumina as a granular carrier is dipped in a mixed aqueous solution containing 0.12 mole of chloroplatinic acid and 0.012 mole of rhodium chloride per liter, dried (120° C) and then reduced with hydrogen at 200° C to obtain a granular catalyst. In the thus produced catalyst, the amounts of platinum and rhodium are 5.13 × 10⁻⁵ mole/g and 4.86 × 10⁻⁶ mole/g, respectively, based on the γ-alumina.

(B) γ-Alumina as a granular carrier is dipped in an aqueous solution containing 1.5 mole/l of nickel nitrate, dried (200° C), calcined at 600° C and then cooled. This operation is repeated four times. The particles are further calcined at 1200° C for 2 hours to obtain a granular carrier of spinel structure consisting of nickel aluminate represented by the formula $$NiAl_2O_4$$

The amount of nickel in the carrier is 3.86 × 10⁻³ mole/g based on alumina.

The granular carrier of spinel structure is dipped in a mixed aqueous solution containing 0.12 mole of chloroplatinic acid and 0.012 mole of rhodium chloride per liter, dried (120° C) and then reduced with hydrogen at 200° C to obtain a granular catalyst. In the thus produced catalyst, the amounts of platinum and rhodium are 5.16 × 10⁻⁵ mole/g and 4.89 × 10⁻⁶ mole/g, respectively, based on the alumina in the granular carrier of spinel structure.

Figure 6:
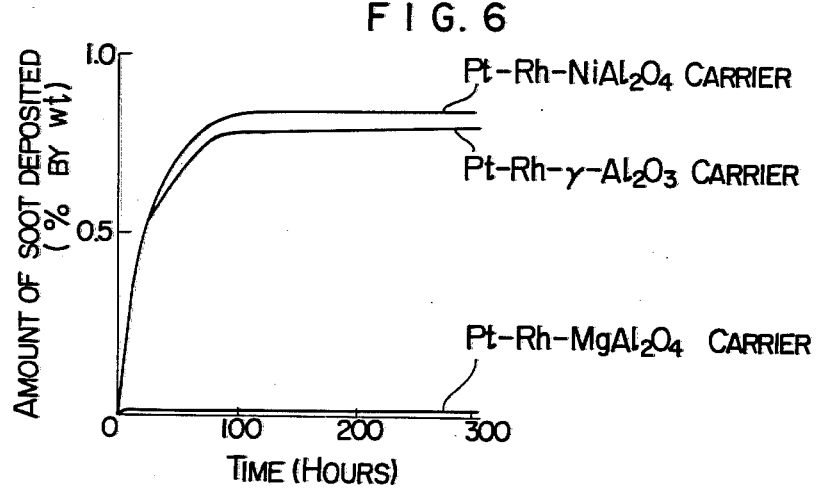
FIG. 6 shows the formation of soot with the lapse of time in a Pt — Rh on $NiAl_2O_4$ catalyst, a Pt — Rh on γ-alumina catalyst and a Pt — Rh on $MgAl_2O_4$ catalyst, respectively.

The reforming of gasoline is carried out by the use of the catalysts of the above-mentioned Example 3, (A) and (B) for 300 hours under the above-mentioned condition I, and the amount of soot deposited is measured every hour. The results obtained are shown in FIG. 6. As is clear from FIG. 6, the amount of soot deposited becomes particularly small (0.01% by weight or less) if magnesium aluminate is used as a carrier. This FIG. 6 shows the characteristic of the catalyst carrier according to the present invention. Since the amount of soot deposited is small as described above, the deterioration of catalytic activity and the disintegration of the catalyst due to soot do hardly occur. Thus, the superiority of the catalysts according to the present invention is apparent.

Figure 7:
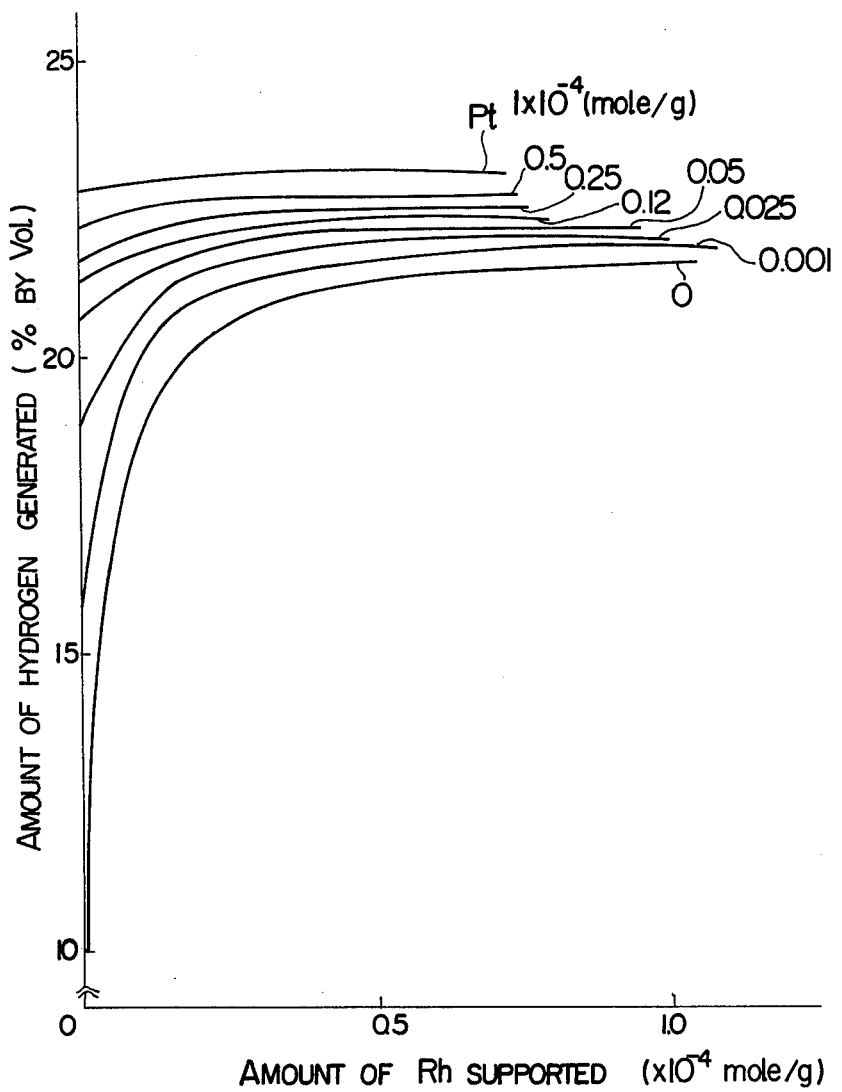
FIG. 7 shows the relationship between the amounts of platinum and rhodium supported by magnesium aluminate of spinel structure and the amount of hydrogen generated.

Also, in Examples 1, 2 and 3, the amounts of platinum and rhodium supported based on the γ-alumina in the carrier of spinel structure are varied by varying the amounts of chloroplatinic acid and rhodium chloride in the aqueous solution, and the reforming of gasoline is carried out by the use of the catalysts thus obtained for 300 hours under the condition I. The results obtained are shown in FIG. 7. As is clear from FIG. 7, larger amounts of platinum and rhodium supported give good reforming results. From a viewpoint of economy, however, the optimum amount is 1 × 10⁻⁴ mole/g or less in the case of platinum only and 1 × 10⁻⁴ mole/g or less in the case of rhodium only. Also, when platinum and rhodium are simultaneously supported, it is preferable from viewpoints of economy and properties that the amounts of platinum and rhodium are within the respective optimum ranges.

Further, the following comparative experiments are carried out in order to show the superiority of platinum-rhodium catalyst.

Figure 8:
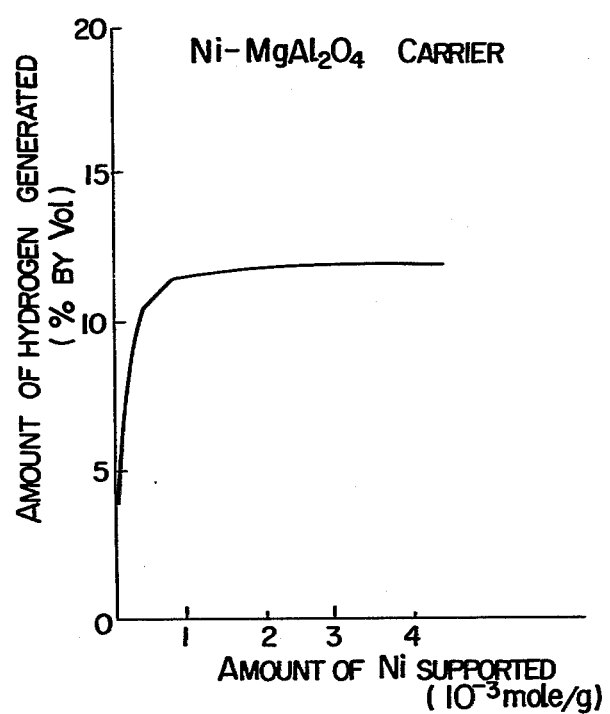
FIG. 8 shows the relationship between the amount of nickel supported by an $MgAl_2O_4$ carrier and the amount of hydrogen generated.
Figure 9:
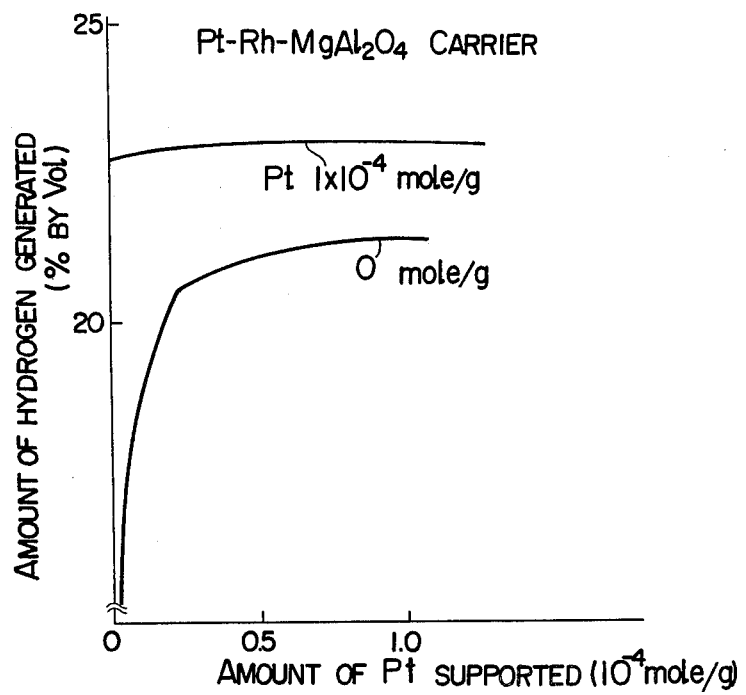
FIG. 9 shows the relationship between the amounts of platinum and rhodium supported by an $MgAl_2O_4$ carrier and the amount of hydrogen generated.

A similar granular carrier of spinel structure to that of Example 1 is prepared. The carrier is dipped in an aqueous nickel nitrate solution, dried at 120° C and then reduced with hydrogen at 400° C to obtain a granular catalyst having a carrier of spinel structure. On the one hand, the above-mentioned carrier is dipped in a mixed solution containing chloroplatinic acid and rhodium chloride, dried at 120° C, and then reduced with hydrogen at 200° C to obtain a granular catalyst having a granular carrier of spinel structure. The amounts of nickel, platinum and rhodium supported based on the alumina in the carrier are varied by varying the amount of nickel nitrate in the aqueous solution and the amounts of chloroplatinic acid and rhodium chloride in the aqueous solution. The reforming of gasoline is carried out by the use of the catalysts thus obtained for 300 hours under the condition I. The results after 300 hours are shown in FIGS. 8 and 9. As is clear from a comparison between FIG. 8 and FIG. 9, platinum and rhodium as a catalyst metal are higher than nickel in catalytic activity. Thus, it is found that the catalysts constituted by supporting platinum and/or rhodium by a carrier of spinel structure have very high catalytic activity.

EXAMPLE 4

Figure 10:
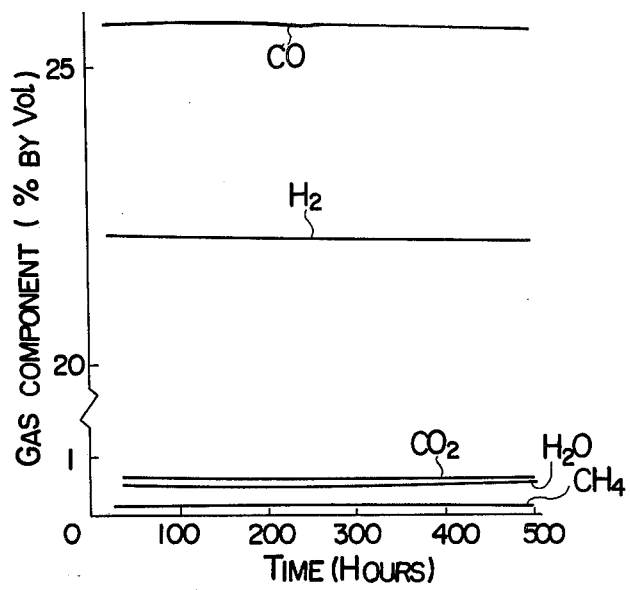
FIG. 10 shows the results of reforming for 500 hours by the use of a Pt — Rh on $MgAl_2O_4$ catalyst in Example 4.

A similar granular carrier of spinel structure to that of Example 1 is prepared. This carrier is dipped in a mixed solution containing 0.024 mole of chloroplatinic acid and 0.006 mole of rhodium chloride per liter, dried at 120° C, and then reduced with hydrogen at 200° C to obtain a granular catalyst. In the thus produced catalyst, the amounts of platinum and rhodium are 1 × 10⁻⁵ mole/g and 2.5 × 10⁻⁶ mole/g, respectively, based on the magnesium aluminate constituting the carrier. The reforming of gasoline is carried out by the use of this catalyst for 500 hours under the condition I. The results obtained are shown in FIG. 10. As is clear from FIG. 10, the stable gas composition is maintained in spite of reforming for a long period of time. It means that the catalyst of the present invention does hardly cause deterioration in activity and a very stable active state is maintained.

Figure 11:
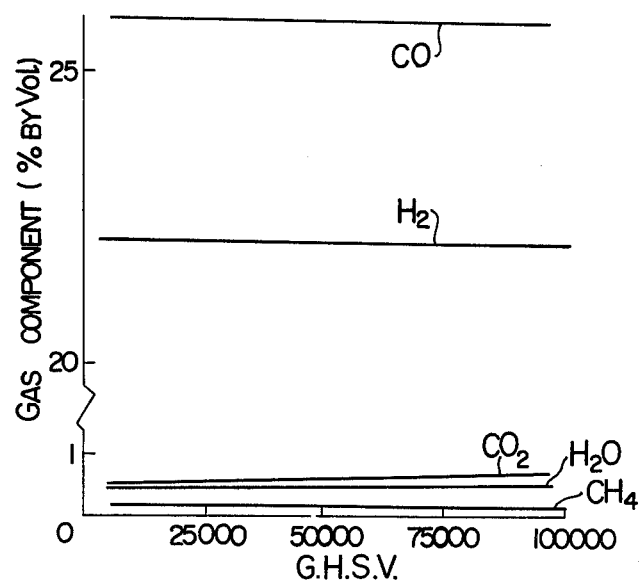
FIG. 11 shows the relationship between the results of reforming and the space velocity (G.H.S.V.) of the reformed gas in the Pt — Rh on $MgAl_2O_4$ catalyst of Example 4 after its use for 500 hours.

Also, the above-mentioned catalyst after reforming for 500 hours is used and the space velocity (G.H.S.V.) of the reformed gas is varied. The results obtained are shown in FIG. 11. The superiority of the catalyst of the present invention will be understood from FIG. 11.

EXAMPLE 5

Figure 12:
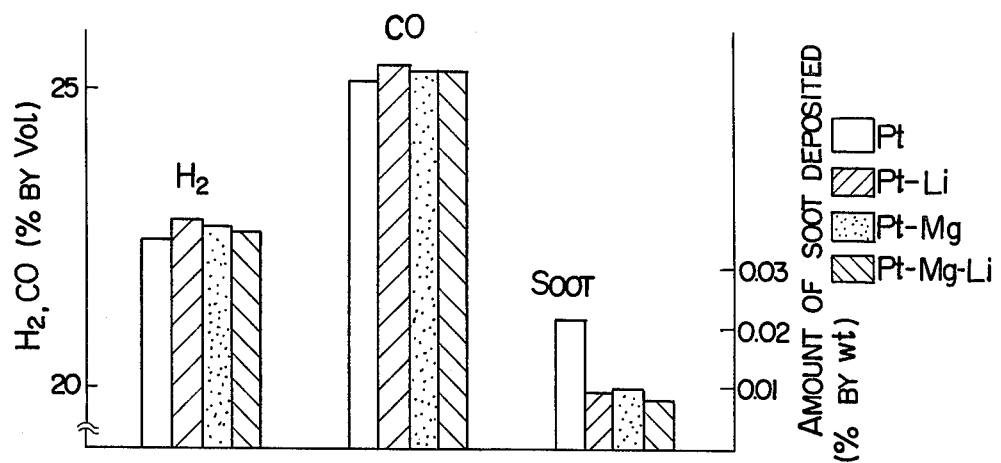
FIG. 12 shows a comparison between a Pt on $MgAl_2O_4$ catalyst, a Pt — Li on $MgAl_2O_4$ catalyst, a Pt — Mg on $MgAl_2O_4$ catalyst and a Pt — Mg — Li on $MgAl_2O_4$ catalyst with regard to the amounts of $H_2$ and CO generated and the amount of soot formed.

A granular carrier of spinel structure produced according to a similar process to that of Example 1 is dipped in a mixed aqueous solution containing 0.1 mole of chloroplatinic acid and 0.5 mole of lithium nitrate per liter, dried (120° C), and then calcined at 700° C to obtain a catalyst. In the thus produced catalyst, 5.27 × 10⁻⁵ mole/g of platinum and 2.85 × 10⁻⁴ mole/g of lithium are supported based on alumina. This catalyst is used in the reforming of gasoline under the above-mentioned condition I. The results obtained are shown in FIG. 12. The gasoline is reformed into $H_2$ and CO. After reforming for 300 hours, the amount of soot formed further decreases and is very small as compared with the case of Example 1 wherein no lithium is added.

EXAMPLE 6

A granular carrier of spinel structure produced according to a similar process to that of Example 1 is dipped in a mixed aqueous solution containing 0.1 mole of rhodium chloride and 0.5 mole of potassium nitrate per liter, dried at 120° C, and then calcined at 700° C to obtain a catalyst. In the catalyst thus produced, 5.66 × 10⁻⁵ mole/g of rhodium and 2.85 × 10⁻⁴ mole/g of potassium are supported based on alumina. This catalyst is used in the reforming of gasoline under the above-mentioned condition I. The results obtained are shown in FIG. 13. The gasoline is reformed into $H_2$ and CO. After 300 hours, the amount of soot formed decreases and is very small as compared with the case of Example 2 wherein no potassium is added.

EXAMPLE 7

A granular carrier of spinel structure produced according to a similar process to that of Example 1 is dipped in a mixed aqueous solution containing 0.024 mole of chloroplatinic acid, 0.006 mole of rhodium chloride and 0.5 mole of lithium nitrate per liter, dried at 120° C, and then calcined at 700° C to obtain a catalyst. In the catalyst thus produced, $1.10 \times 10^{-5}$ mole/g of platinum, $2.5 \times 10^{-6}$ mole/g of rhodium and $2.73$ mole/g of lithium are supported based on alumina. This catalyst is used in the reforming of gasoline under the above-mentioned condition I. The results obtained are shown in FIG. 14. The gasoline is reformed into $H_2$ and CO. After 300 hours, the amount of soot deposited decreases and is very small as compared with the case of Example 3 wherein no lithium is added.

EXAMPLE 8

A granular carrier of spinel structure produced according to a similar process to that of Example 1 is dipped in a mixed aqueous solution containing 0.1 mole of chloroplatinic acid and 0.5 mole of magnesium nitrate per liter, dried and then calcined at 700° C to obtain a catalyst. In the catalyst thus produced, $5.32 \times 10^{-5}$ mole/g of platinum and $2.98 \times 10^{-4}$ mole/g of magnesium are supported based on alumina. This catalyst is used in the reforming of gasoline under the above-mentioned condition I. The results obtained are shown in FIG. 12. The gasoline is reformed into $H_2$ and CO. The amount of soot formed after 300 hours decreases and is very small as compared with the case of Example 1 wherein no magnesium is added.

EXAMPLE 9

A granular carrier of spinel structure produced according to a similar process to that of Example 1 is dipped in a mixed aqueous solution containing 0.1 mole of rhodium chloride and 0.5 mole of calcium nitrate per liter, dried and then calcined at 700° C to obtain a catalyst. In the catalyst thus produced, $5.78 \times 10^{-5}$ mole/g of rhodium and $2.75 \times 10^{-4}$ mole/g of calcium are supported based on alumina. This catalyst is used in the reforming of gasoline under the above-mentioned condition I. The results obtained are shown in FIG. 13. The gasoline is reformed into $H_2$ and CO. The amount of soot formed after 300 hours decreases and is very small as compared with the case of said Example 2 wherein no calcium is added.

EXAMPLE 10

A granular carrier of spinel structure produced according to a similar process to that of Example 1 is dipped in a mixed aqueous solution containing 0.024 mole of chloroplatinic acid, 0.006 mole of rhodium chloride and 0.5 mole of barium nitrate per liter, dried at 120° C and then calcined at 700° C to obtain a catalyst. In the catalyst thus produced, $1.15 \times 10^{-6}$ mole/g of platinum, $2.38 \times 10^{-6}$ mole/g of rhodium and $2.62 \times 10^{-4}$ mole/g of barium are supported based on alumina. This catalyst is used in the reforming of gasoline under the above-mentioned condition I. The results obtained are shown in FIG. 14. The gasoline is reformed into $H_2$ and CO. The amount of soot deposited after 300 hours decreases and is very small as compared with the case of said Example 4 wherein no barium is added.

EXAMPLE 11

A granular carrier of spinel structure produced according to a similar process to that of Example 1 is dipped in a mixed aqueous solution containing 0.1 mole of chloroplatinic acid, 0.25 mole of magnesium nitrate and 0.25 mole of lithium nitrate per liter, dried at 120° C and then calcined at 700° C to obtain a catalyst. In the catalyst thus produced, $5.37 \times 10^{-5}$ mole/g of platinum, $1.38 \times 10^{-4}$ mole/g of magnesium and $1.42 \times 10^{-4}$ mole/g of lithium are supported based on alumina. This catalyst is used in the reforming of gasoline under the above-mentioned condition I. The results obtained are shown in FIG. 12. The gasoline is reformed into $H_2$ and CO. The amount of carbon deposited after 300 hours decreases and is very small as compared with the case of said Example 1 wherein magnesium and lithium are not added.

EXAMPLE 12

A granular carrier of spinel structure produced according to a similar process to that of Example 1 is dipped in a mixed aqueous solution containing 0.1 mole of rhodium chloride, 0.25 mole of potassium nitrate and 0.25 mole of calcium nitrate per liter, dried at 120° C and then calcined at 700° C to obtain a catalyst. In the catalyst thus produced, $5.73 \times 10^{-5}$ mole/g of rhodium, $1.38 \times 10^{-4}$ mole/g of potassium and $1.43 \times 10^{-4}$ mole/g of calcium are supported based on alumina. This catalyst is used in the reforming of gasoline under the above-mentioned condition I. The results obtained are shown in FIG. 13. The gasoline is reformed into $H_2$ and CO. The amount of soot deposited after 300 hours decreases and is very small as compared with the case of said Example 2 wherein potassium and calcium are not added.

Example 13

A granular carrier of spinel structure produced according to a similar process to that of Example 1 is dipped in a mixed aqueous solution containing 0.024 mole of chloroplatinic acid, 0.006 mole of rhodium chloride, 0.25 mole of lithium nitrate and 0.25 mole of barium nitrate per liter, dried (120° C) and then calcined at 700° C to obtain a catalyst. In the catalyst thus produced, $1.10 \times 10^{-5}$ mole/g of platinum, $2.18 \times 10^{-6}$ mole/g of rhodium, $1.40 \times 10^{-4}$ mole/g of lithium and $1.30 \times 10^{-4}$ mole/g of barium are supported based on alumina. This catalyst is used in the reforming of gasoline under the above-mentioned condition I. The results obtained are shown in FIG. 14. The gasoline is reformed into $H_2$ and CO. The amount of soot deposited after 300 hours decreases and is very small as compared with the case of said Example 4 wherein lithium and barium are not added.

The catalyst as produced as described above is used in the reforming of gasoline under the above-mentioned condition II. The results obtained are as shown in Table 4.

Table 4

| Product gas (% by vol.) | $H_2$ | CO | $CH_4$ | $CO_2$ | $H_2O$ | $N_2$ | Soot (% by wt.) |
|---|---|---|---|---|---|---|---|
| Initial stage | 29.7 | 28.4 | — | 0.4 | 0.5 | 41.0 | — |
| After 300 hours | 29.6 | 28.4 | — | 0.4 | 0.6 | 41.0 | — |

Thus, the gasoline is reformed into $H_2$, CO, etc. The amount of soot deposited after 300 hours is very small.

Experiments regarding the following items are carried out by the use of the catalyst of the above-mentioned Example 13.

Figure 16:
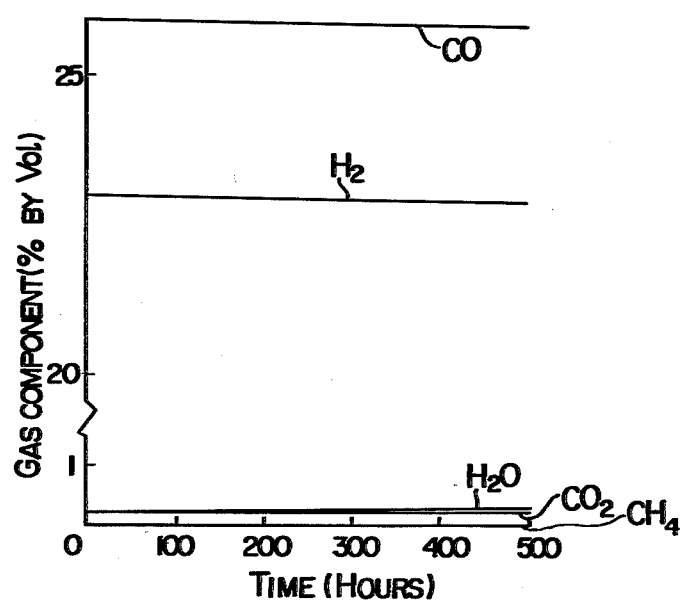
FIG. 16 shows the results of reforming for 500 hours by the use of a Pt — Rh — Li — Ba on $MgAl_2O_4$ catalyst in Example 13.

(i) The reforming of gasoline is carried out for 500 hours under the above-mentioned condition I. The results obtained are shown in FIG. 16. As is clear from FIG. 16, a stable gas composition can be maintained in spite of reforming for a long period of time. It means that the catalyst of the present invention does hardly show the deterioration of its activity and can maintain a very stable active state.

(ii) A relationship between the space velocity of the reformed gas and the gas composition after reforming is examined by the use of the above-mentioned catalyst after reforming for 500 hours. The results obtained are shown in FIG. 17. The superiority of the catalyst of the present invention will be understood from FIG. 17.

(iii) The reforming of gasoline is carried out for 500 hours under the above-mentioned condition I and a change in the amount of soot deposited with the lapse of reforming time is examined. The results obtained are shown in FIG. 18. As is clear from FIG. 18, the amount of soot deposited is about 0.005% by weight even after reforming for 500 hours and the amount of soot deposited is almost constant. As is clear from a comparison between FIG. 16 and FIG. 18, the amount of soot deposited is very small and the gas composition is not so affected by the deposition of soot. In the case of the catalyst of the present invention, therefore, the amount of soot deposited on reforming is very small and deterioration in activity and disintegration of the catalyst due to the deposition of soot can be obviated. Further, it is clear from FIG. 16 and FIG. 18 that the thermal deterioration of the catalyst due to the formation of compounds of platinum, rhodium, an alkali metal or an alkaline earth metal as a catalyst metal with a carrier and the thermal deterioration of the catalyst due to the crystallization of these catalyst metals themselves do not occur.

Figure 15:
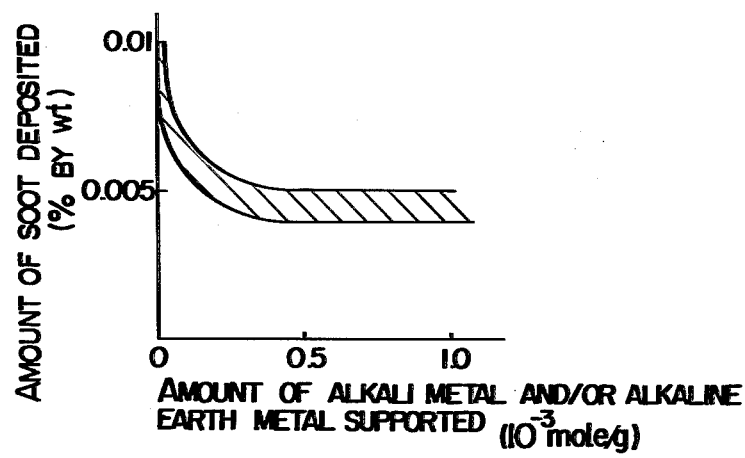
FIG. 15 shows the relationship between the amount of an alkali metal and/or alkaline earch metal added and the amount of soot formed in a Pt — Rh — alkali metal — alkaline earth metal on $MgAl_2O_4$ catalyst.

The reforming of gasoline is carried out for 300 hours under the same conditions as in Example 1 by replacing lithium and barium used as an additive in the catalyst in said Example 13 by the other alkali metals and alkaline earth metals. A relationship between the amount of the metals added and the amount of soot deposited is shown in FIG. 15. Here, the other alkali metals and alkaline earth metals comprise magnesium, calcium and potassium. As is clear from FIG. 15, the amount of carbon deposited becomes constant at 0.004 to 0.005% by weight. Thus, even if more than $1 \times 10^{-3}$ mole/g of the alkali metals and/or alkaline earth metals based on alumina are added, the performance is the same. Therefore, it is preferable from the viewpoint of economy to use $1 \times 10^{-3}$ mole/g or less of the metals.

EXAMPLE 14

In the production of a catalyst in said Examples 1, 2 and 4, the aqueous solution is replaced by an alcohol solution. The reforming of gasoline is carried out by the use of the catalysts thus obtained under the same conditions as in Example 1. As a result, the gas composition and the amount of soot deposited are respectively almost the same as in Examples 1, 2 and 4. Thus, it is found that an alcohol solution can also give a satisfactory result.

EXAMPLE 15

The supporting of chloroplatinic acid, rhodium chloride, an alkali metal and an alkali earth metal by a carrier in said Examples 5 to 13 is carried out stepwise by, for example, supporting platinum first, then supporting rhodium, and finally supporting an alkali metal and an alkaline earth metal. The order of supporting can be freely determined. The reforming of gasoline is carried out by the use of the catalysts thus obtained under the same conditions as in the respective examples. As a result, the amount of soot formed after reforming for 300 hours is almost the same as in said Examples 5 to 13.

What is claimed is:

1. A catalyst suitable for reforming hydrocarbon fuels by air partial oxidation or steam reforming into a hydrogen-rich reformed gas comprising an active carrier consisting of magnesium aluminate of spinel structure as represented by the formula $$MgAl_2O_4$$

consisting of alumina and magnesium and the amount of magnesium is $2 \times 10^{-3}$ to $1 \times 10^{-2}$ mole/g based on the alumina and at least one catalyst metal selected from the group consisting of platinum, rhodium and a mixture thereof in an amount of $1 \times 10^{-4}$ mole/g or less based on the alumina supported by said carrier.

2. A catalyst according to claim 1 wherein a catalyst metal selected from the group consisting of alkali metals, alkaline earth metals and a mixture thereof in an amount of $1 \times 10^{-3}$ mole/g or less based on the carrier.

3. A catalyst according to claim 2, wherein said catalyst metal is platinum and a catalyst metal selected from the group consisting of lithium, magnesium and a mixture thereof is further supported by said active carrier.

4. A catalyst according to claim 2, wherein said catalyst metal is rhodium and a catalyst metal selected from the group consisting of potassium, calcium and a mixture thereof is further supported by said active carrier.

5. A catalyst according to claim 2, wherein said catalyst metal is platinum and rhodium and a catalyst metal selected from the group consisting of lithium, barium and a mixture thereof is further supported by said active carrier.

* * * * *